United States Patent
Hogan et al.

(10) Patent No.: US 10,329,091 B2
(45) Date of Patent: Jun. 25, 2019

(54) COLLAPSIBLE DEBRIS CHUTE AND DEBRIS REMOVAL METHOD

(71) Applicants: Timothy G. Hogan, Saugus, MA (US); Leo T. Guarente, Saugus, MA (US)

(72) Inventors: Timothy G. Hogan, Saugus, MA (US); Leo T. Guarente, Saugus, MA (US)

( * ) Notice: Subject to any disclaimer, the term of this patent is extended or adjusted under 35 U.S.C. 154(b) by 0 days.

(21) Appl. No.: 15/659,609

(22) Filed: Jul. 25, 2017

(65) Prior Publication Data
US 2018/0022552 A1 Jan. 25, 2018

Related U.S. Application Data

(60) Provisional application No. 62/366,213, filed on Jul. 25, 2016.

(51) Int. Cl.
| | |
|---|---|
| *B65G 11/00* | (2006.01) |
| *B65G 11/10* | (2006.01) |
| *B65G 11/18* | (2006.01) |
| *B65G 11/02* | (2006.01) |
| *B65B 67/12* | (2006.01) |
| *E04F 17/12* | (2006.01) |
| *E04G 23/08* | (2006.01) |
| *B65F 1/00* | (2006.01) |

(52) U.S. Cl.
CPC ........ *B65G 11/023* (2013.01); *B65B 67/1205* (2013.01); *B65G 11/026* (2013.01); *B65G 11/103* (2013.01); *B65G 11/106* (2013.01); *E04F 17/12* (2013.01); *E04G 23/08* (2013.01); *B65F 1/00* (2013.01); *B65F 2240/118* (2013.01)

(58) Field of Classification Search
None
See application file for complete search history.

(56) References Cited

U.S. PATENT DOCUMENTS

| | | | |
|---|---|---|---|
| 240,289 A | 4/1881 | Walbridge | |
| 837,602 A | 12/1906 | Benenato | |
| 1,339,338 A * | 5/1920 | Hickok | ............... A01D 46/243 182/49 |
| 3,583,748 A | 6/1971 | Arndt | |

(Continued)

FOREIGN PATENT DOCUMENTS

FR 2398666 A1 * 2/1979 ............... B65B 1/00

*Primary Examiner* — Kavel Singh
(74) *Attorney, Agent, or Firm* — Thomas P. O'Connell; O'Connell Law Firm (57) ABSTRACT

A collapsible chute for conveying materials with a tubular main body of flexible material with an entrance opening, an exit opening, and a body portion between the entrance and exit openings. A first reinforcing band is fixed to surround the body portion adjacent to the entrance opening, and a first plurality of loops is spaced along the first reinforcing band. A second reinforcing band is fixed to surround the body portion spaced from the first reinforcing band and spaced from the exit opening, and a second plurality of loops is spaced along the second reinforcing band. A third reinforcing band can be fixed to surround the body portion between the first and second reinforcing bands, and a third plurality of loops is spaced along the third reinforcing band. A method for debris removal comprises affixing the entrance opening of the body portion of the main body to an opening of a building structure and evacuating debris through the main body of the collapsible chute.

12 Claims, 6 Drawing Sheets

(56) References Cited

U.S. PATENT DOCUMENTS

| | | | |
|---|---|---|---|
| 4,099,596 A | | 7/1978 | Tracy |
| 4,944,604 A | * | 7/1990 | Myklebust ......... B65D 88/1618 |
| | | | 383/17 |
| 5,472,768 A | | 12/1995 | Anson |
| 6,276,507 B1 | * | 8/2001 | Smedlund ............. B65F 1/0093 |
| | | | 193/21 |
| 6,431,753 B1 | | 8/2002 | Rogers et al. |
| 6,834,995 B1 | | 12/2004 | Stevens |
| 6,877,534 B1 | | 4/2005 | Hendrickson, Jr. et al. |
| D505,436 S | | 5/2005 | Griggs et al. |
| 6,994,182 B2 | | 2/2006 | Wang |
| 7,648,015 B2 | * | 1/2010 | Gillmore ............... B28C 5/4248 |
| | | | 193/5 |
| 8,353,416 B2 | | 1/2013 | Mueller |
| 9,475,641 B1 | | 10/2016 | Brandon |
| 2004/0262083 A1 | | 12/2004 | Wang |
| 2005/0178917 A1 | * | 8/2005 | Bonaceto ............... B64D 17/10 |
| | | | 244/145 |
| 2012/0281932 A1 | | 11/2012 | Rugheimer |

\* cited by examiner

COLLAPSIBLE DEBRIS CHUTE AND DEBRIS REMOVAL METHOD

RELATED APPLICATION

This application claims priority to Provisional Application No. 62/366,213, filed Jul. 25, 2016, which is incorporated herein by reference.

FIELD OF THE INVENTION

The present invention relates generally to debris removal from building structures. Stated more particularly, disclosed herein is a collapsible debris chute formed from flexible material that creates an easy and lightweight solution to removing debris, such as construction debris, from building structures, including structures that are two-stories tall or more. Further disclosed is a method for facilitating the removal and transportation of debris from a building structure by use of such a collapsible debris chute.

BACKGROUND OF THE INVENTION

In the construction, demolition, and remodeling of building structures, construction and demolition debris must be removed from the building structure and, more particularly, from the floor where the work is being done. On the higher floors, the removal of the construction waste can often be a troublesome and time-consuming endeavor. Hand-carrying construction waste from upper floors through the interior of the building is cumbersome and can produce highly undesirable damage to the interior of the building. Tossing debris from the upper floors of a building avoids the need for carrying the material through the building interior, but can be dangerous to bystanders and the building itself and difficult to do effectively without undesirably spreading debris about the worksite.

The prior art has disclosed debris chutes that can be erected at construction sites, such as multi-story homes and buildings, for use in the removal of construction debris from upper floors of the home or building. Prior art debris chutes are typically formed with a plurality of segments. The segments of chutes typical to the prior art normally comprise generally rigid plastic sleeves connected in series, such as by chains or other flexible connectors. Together, the flexibly connected cylindrical or semi-cylindrical segments form an elongate cylindrical or semi-cylindrical chute structure of a length depending on, among other things, the number of connected segments.

So formed, the debris chute is connected to an exterior of a building, such as in communication with a window, door, roof or other opening, with the elongate chute disposed generally vertically or along an arcuate downward direction. A first opening of the chute located proximal the elevated building location allows the user to toss debris therein. A second opening positioned, for example, above a disposal dumpster, bin, or truck located at ground level allows egress of debris conveyed by the debris chute directly into the dumpster, bin, truck, or other recipient structure. Accordingly, these and similar debris chutes of the prior art offer a method for rapidly evacuating construction debris from building structures while minimizing the need for handling and carrying the debris through the building structure.

However, the debris chutes of the prior art suffer from a number of disadvantages. For example, with the plural rigid segments forming the chute, prior art debris chutes often cause damage to the building structure, landscaping, vehicles, and even nearby persons. Moreover, where the sections of the debris chute are merely semi-cylindrical, dust and debris can often escape the chute thereby leading to contamination and further risks of damage and injury. Moreover, with the bulky, heavy, and substantially rigid sections that form the chute, the debris chutes of the prior art can be exceedingly cumbersome and difficult to store, transport, and install.

With a knowledge of and appreciation for the foregoing, the present inventors appreciate that there is a need for a collapsible debris chute that overcomes one or more of the foregoing disadvantages. Without limitation, there is a recognized and longstanding need in the art of construction debris removal for a debris chute that is effective in conveying material while demonstrating light weight and compact storage and transportation characteristics. There is a further, recognized need in the art of construction debris removal for such a debris chute that can be used individually to convey debris in an enclosed manner over a given distance or in overlapping series to convey debris in a substantially enclosed manner thereby to minimize site contamination and cleanup by facilitating effective and substantially complete conveyance from entry into the debris chute to exit into a storage or transport container.

SUMMARY OF THE INVENTION

In view of the state of the art and the limitations and deficiencies of current collapsible debris chutes as summarized above, the present inventors set forth with the basic object of providing a collapsible debris chute that creates an easy, effective, and lightweight solution to removing construction debris from building structures.

A further object of the invention is to provide a collapsible debris chute that can be stored and transported conveniently, that can be rendered readily available, and that is reusable.

Another object of the invention is to provide a collapsible debris chute that is durable and easy to use and that will not scratch, damage, or injury the building, personal property, or nearby persons.

Still another object of embodiments of the invention is to provide a collapsible debris chute that can be coupled in series to enable the creation of a longer chute structure where necessary.

A further object of embodiments of the invention is to provide a collapsible debris chute capable of conveying debris in a substantially enclosed manner thereby to minimize site contamination and cleanup by facilitating effective and substantially complete conveyance from entry into the debris chute to exit into a storage or transport container.

These and further objects and advantages of embodiments of the invention will become obvious not only to one who reviews the present specification but also to one who has an opportunity to make use of an embodiment of the collapsible debris chute disclosed herein. It will be appreciated, however, that, although the accomplishment of each of the foregoing objects in a single embodiment of the invention may be possible and indeed preferred, not all embodiments will seek or need to accomplish each and every potential object and advantage. Nonetheless, all such embodiments should be considered within the scope of the invention.

In carrying forth one or more objects of the invention, a collapsible chute for permitting the conveyance of materials is founded on a tubular main body with an entrance opening, an exit opening, and a body portion between the entrance opening and the exit opening. The main body is formed from a flexible material. A first reinforcing band is fixed to surround the body portion of the main body, and a first plurality of loops is fixed to the first reinforcing band and the body portion of the main body. The first plurality of loops are spaced along the first reinforcing band. A second reinforcing band is fixed to surround the body portion of the main body spaced from the first reinforcing band, and a second plurality of loops is fixed to the second reinforcing band and the body portion of the main body wherein the second plurality of loops are spaced along the second reinforcing band.

In certain embodiments of the collapsible chute, the first reinforcing band is fixed to the body portion of the main body adjacent to the entrance opening. The second reinforcing band can be fixed to the body portion of the main body spaced from the entrance opening and spaced from the exit opening. For instance, where the body portion of the main body is considered to have a length, the second reinforcing band can be fixed to the body portion of the main body spaced from the exit opening by approximately twenty percent of the length of the main body.

Where the first reinforcing band and the first plurality of loops are fixed to the body portion of the main body adjacent to the entrance opening and the second reinforcing band and the second plurality of loops are fixed to the body portion of the main body spaced from the entrance opening and spaced from the exit opening, first and second collapsible chutes can be connected in series by a coupling of the first plurality of loops of the second collapsible chute with the second plurality of loops of the first collapsible chute. With that, the body portions of the main bodies of the first and second collapsible chutes are disposed in an overlapping configuration.

A third reinforcing band can be fixed to surround the body portion of the main body. Where included, the third reinforcing band is spaced between the first reinforcing band and the second reinforcing band. A third plurality of loops is fixed to the third reinforcing band and the body portion of the main body with plurality of loops being spaced along the third reinforcing band.

As disclosed herein, the main body can be substantially cylindrical, and the entrance opening and the exit opening can be substantially annular when the collapsible chute is in a use configuration. Further, the body portion of the main body can taper from the entrance opening to the exit opening.

The reinforcing bands may be fixed to the body portion of the main body by stitching. Each of the plurality of loops can be fixed to the reinforcing bands and the body portion of the main body by stitching disposed in a pattern, such as an X pattern.

In particular embodiments, the body portion of the main body can be formed from a woven thermoplastic polymer. For instance, the body portion of the main body can be formed from woven polypropylene. It is further contemplated that the body portion of the main body can be formed from lightweight flexible intermediate bulk container (FIBC) material.

A method for debris removal from a building structure can comprise providing the disclosed collapsible chute, affixing the entrance opening of the body portion of the main body to a building structure, and evacuating debris through the main body of the collapsible chute. Such a method can further include providing a flexible intermediate bulk container (FIBC) and disposing the flexible intermediate bulk container (FIBC) to receive debris from the exit of the main body of the collapsible chute.

One will appreciate that the foregoing discussion broadly outlines the more important features of the invention merely to enable a better understanding of the detailed description that follows and to instill a better appreciation of the inventors' contribution to the art. Before an embodiment of the invention is explained in detail, it must be made clear that the following details and descriptions of inventive concepts are mere examples of the many possible manifestations of the invention.

DETAILED DESCRIPTION OF PREFERRED EMBODIMENTS

The collapsible debris chute disclosed herein is subject to varied embodiments, each within the scope of the invention. However, to ensure that one skilled in the art will be able to understand and, in appropriate cases, practice the present invention, certain preferred embodiments of the broader invention revealed herein are described below.

Looking more particularly to the drawings, a collapsible debris chute according to the present invention is indicated generally at 10 in FIGS. 1 through 3B. As can be perceived with reference to FIGS. 1 and 2, the collapsible debris chute 10 has a main body 12, a top opening or entrance opening 16, and a bottom opening or exit opening 14. When the main body 12 is in a use configuration as in FIGS. 1 and 2, the main body 12 pursues a generally cylindrical shape, and the top opening 16 and the bottom opening 14 pursue generally annular shapes.

Figure 1:
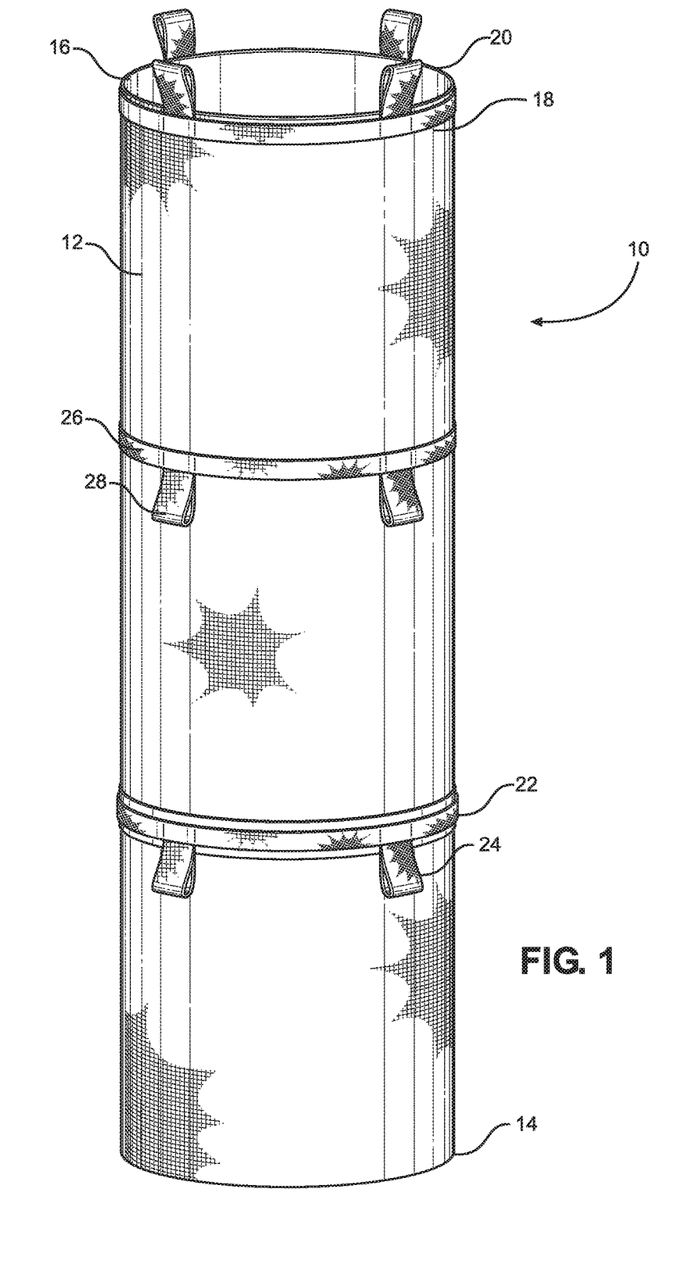
FIG. 1 is a perspective view of a collapsible debris chute as taught herein.
Figure 2:
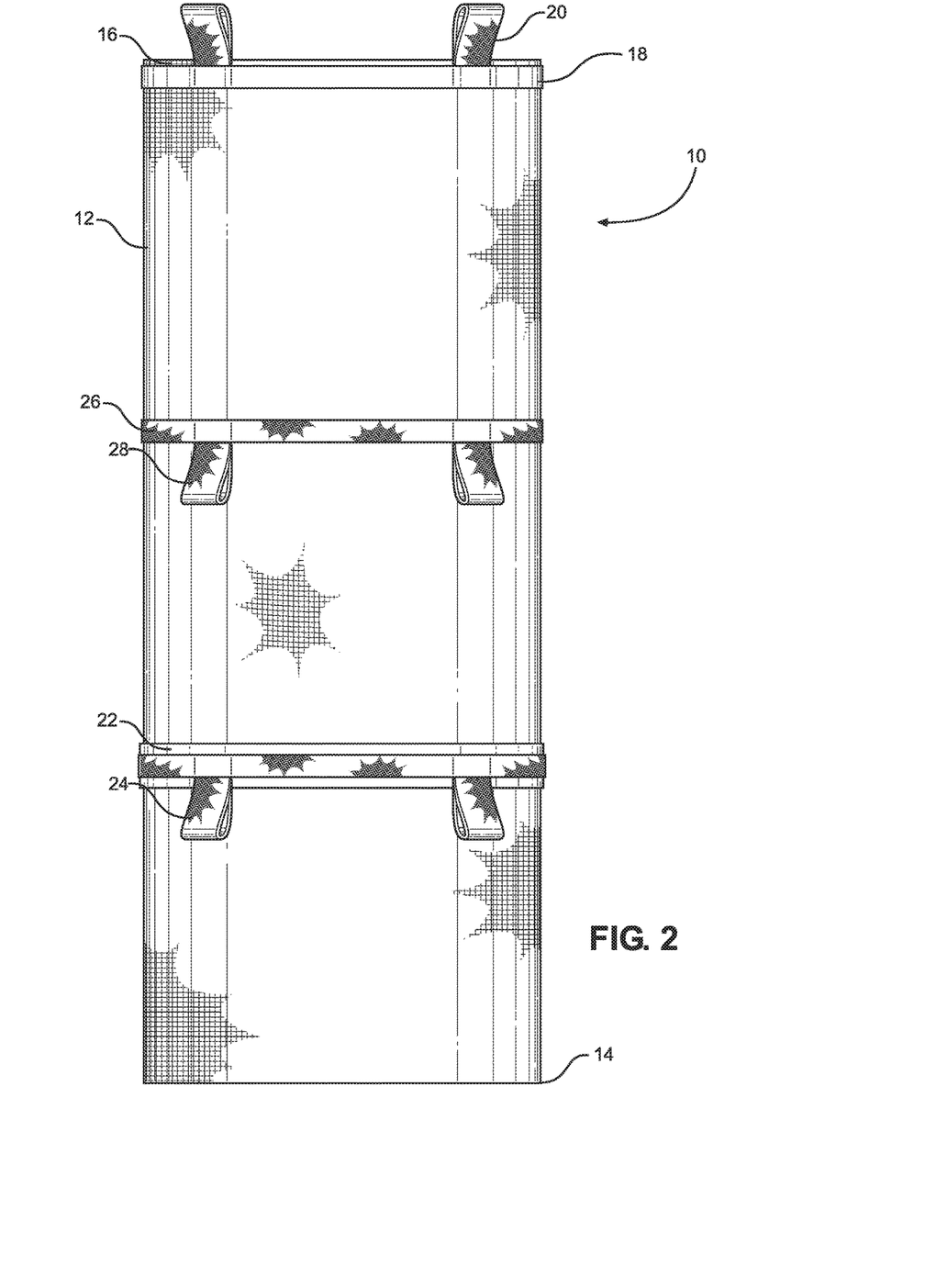
FIG. 2 is a view in front elevation of the collapsible debris chute.
Figure 3A:
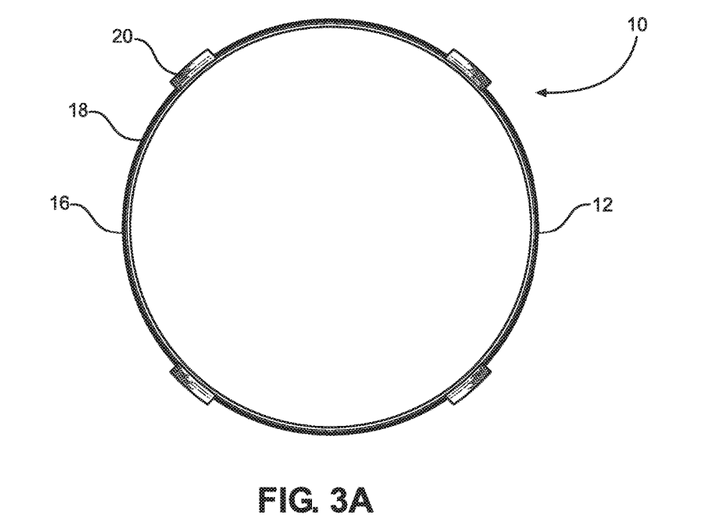
FIG. 3A is a top plan view of the collapsible debris chute.
Figure 3B:
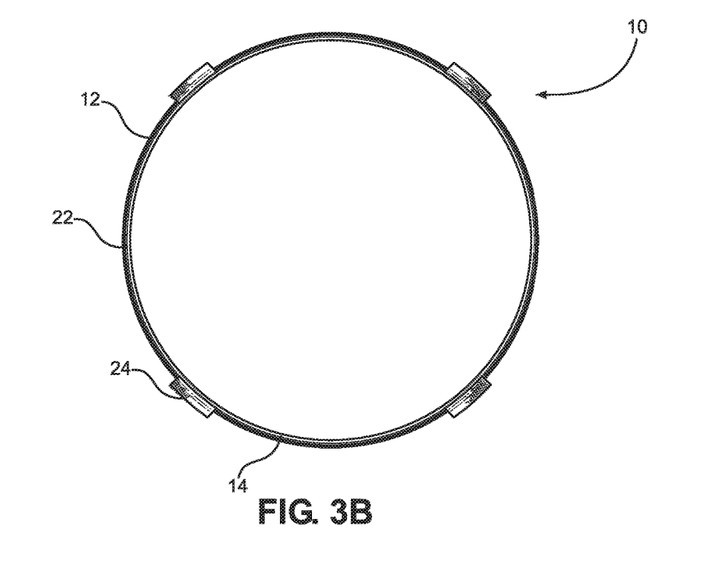
FIG. 3B is a bottom plan view of the collapsible debris chute.

The main body 12 of the collapsible debris chute 10 is preferably formed from a tough, flexible material, which can be disposed in one layer or in multiple layers. One panel or multiple panels of the material for the main body 12 can be formed into a cylinder, such as by stitching, adhesive, or some other method or combination thereof, to form a tough cylinder.

The material could be natural or synthetic, woven or non-woven. In certain embodiments, the material for the main body 12 could be manufactured, such as with weaving equipment. The main body 12 could, for instance, be of lightweight flexible intermediate bulk container (FIBC) material. The material for the main body 12 could, for example, be a coated or uncoated woven polypropylene or polyvinyl fabric material. In other embodiments, it would be possible to form the main body 12 from another material or materials, including, by way of a non-limiting example, canvas or another tough material that may now exist or hereafter be developed. The fabric material for the main body 12 can be manufactured and potentially coated to be substantially water resistant to minimize or eliminate leakage of any liquids passed through the debris chute 10.

Figure 4:
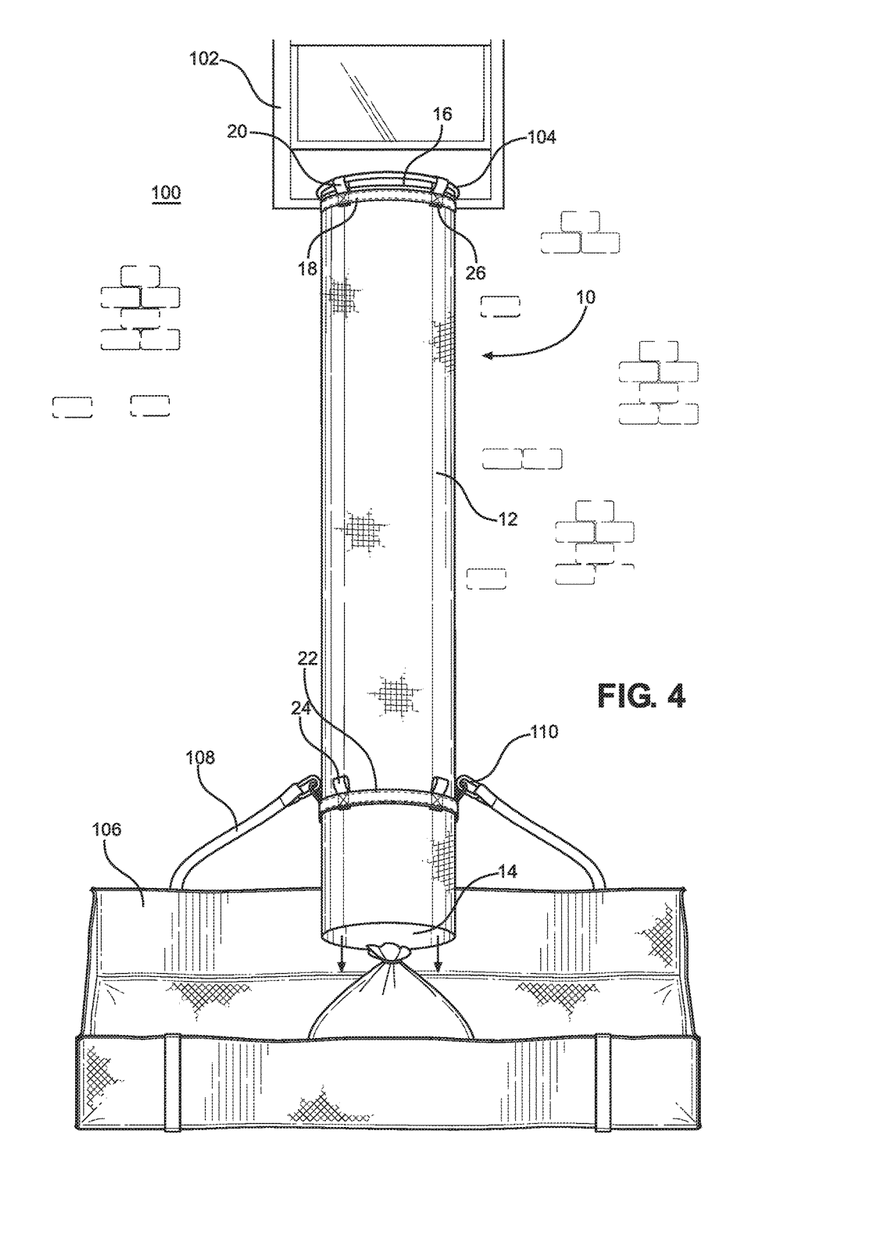
FIG. 4 is a perspective view of a collapsible debris chute according to the invention applied to a building structure.
Figure 5:
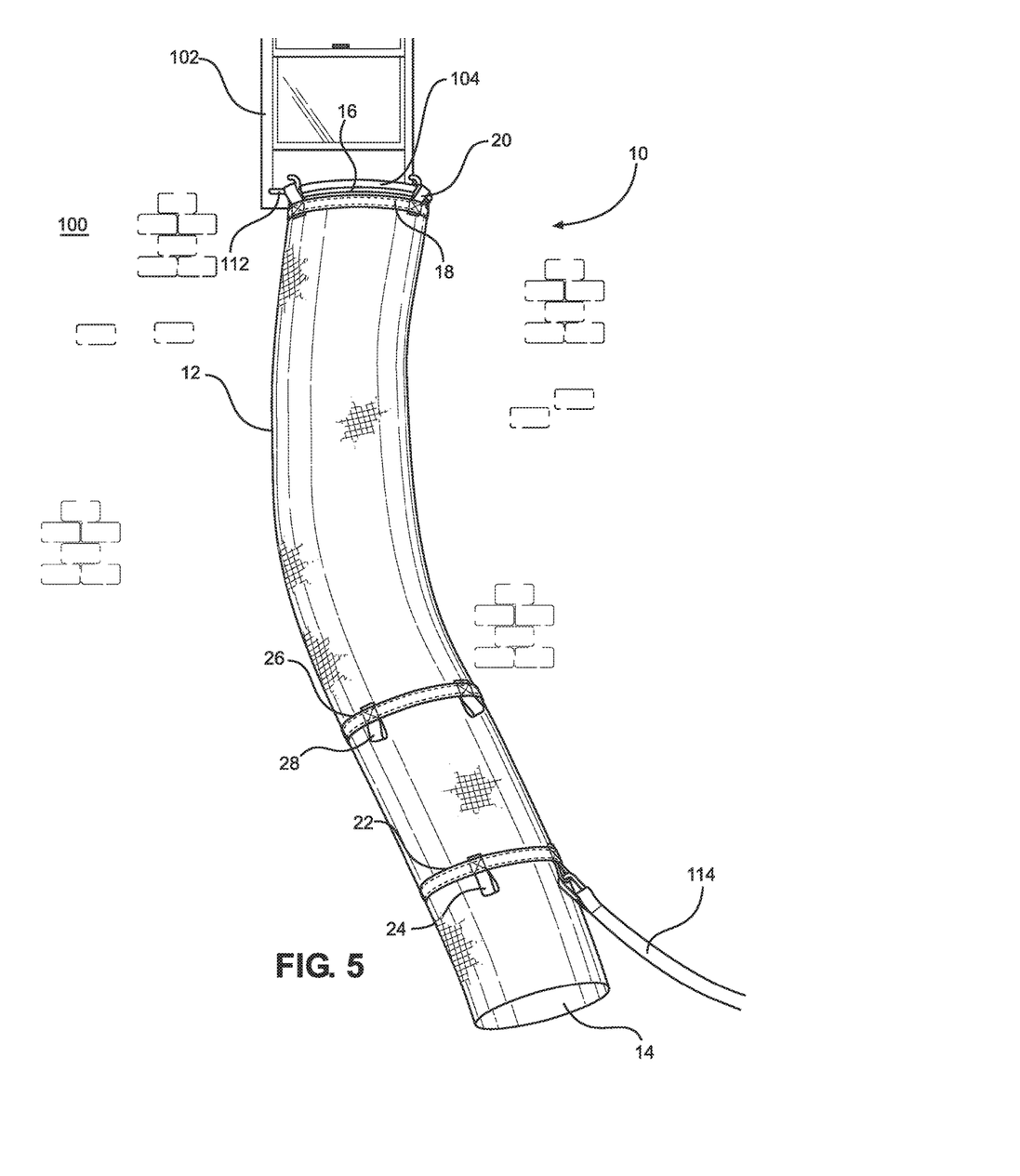
FIG. 5 is a perspective view of an alternative collapsible debris chute according to the invention applied to a building structure.
Figure 6:
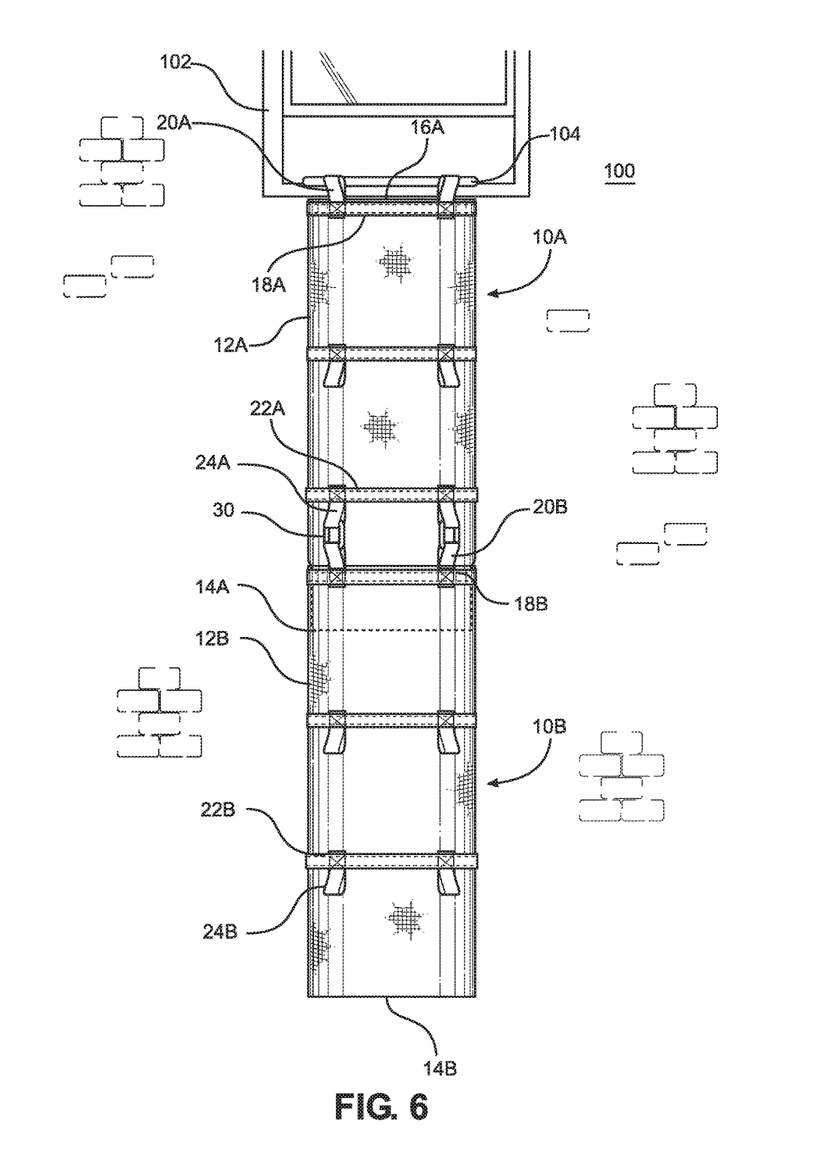
FIG. 6 is a perspective view of plural collapsible debris chute retained in series relative to a building structure.

The collapsible debris chute 10 has a heavy duty upper reinforcing band or bands 18 encircling the main body 12 immediately adjacent to the annular top opening 16 of the main body 12. The upper reinforcing band 18 is fixed to the main body 12 by heavy stitching, adhesive, or some other method or combination thereof. As shown in FIGS. 4 through 6, for instance, plural lines of heavy stitching traverse the entire periphery of the reinforcing band 18 and the main body 12.

A plurality of upper loops 20 are affixed at or adjacent to the top opening 16 of the main body 12. More particularly, four loops 20 are approximately equally spaced about the periphery of the annular top opening 16. The loops 20 have free loop portions and base portions that are secured to the main body 12 adjacent to the top opening 16 by being disposed between the reinforcing band 18 and the material of the main body 12 and fixed in place as by heavy stitching, adhesive, or any other effective method or combination thereof. As FIGS. 4 through 6 show, for instance, the base portions of the loops 20 can be fixed in place by the lines of stitching traversing the periphery of the reinforcing band 18 and, further, by heavy stitching disposed in an X or other pattern through the reinforcing band 18, the base portions of the loops 20, and the underlying material of the main body 12.

Moreover, a lower reinforcing band 22 is fixed to encircle the main body 12 adjacent to the bottom opening 14 of the main body 12 spaced a given distance from the bottom opening 14. In one example of the invention where the main body 12 has a length of approximately ten feet, the reinforcing band 22 encircles the main body 12 at a distance of approximately 24 inches from the exit 14, which equates to approximately twenty percent of the overall length of the main body 12. The reinforcing band 22 is fixed to span the periphery of the main body 12 by lines of heavy stitching traversing the entire periphery of the main body 12. As discussed further hereinbelow, the spacing of the lower reinforcing band 22 from the bottom opening 14 permits plural debris chutes 10 as taught herein to be secured in series while providing overlapping, fully enclosed passageways for the passage of debris.

A plurality of lower loops 24 are affixed to the main body 12 through the lower reinforcing band 22. More particularly, four loops 24 are approximately equally spaced about the periphery of the main body 12 at the lower reinforcing band 22. The loops 24 have free loop portions and base portions that are secured to the main body 12 by being disposed between the reinforcing band 22 and the material of the main body 12 and fixed in place as by heavy stitching, adhesive, or any other effective method or combination thereof. As FIGS. 4 through 6 show, for instance, the base portions of the loops 24 can be fixed in place by the lines of stitching traversing the periphery of the reinforcing band 22 and, further, by heavy stitching disposed in an X or other pattern through the reinforcing band 22, the base portions of the loops 24, and the underlying material of the main body 12.

Further, in the embodiments of FIGS. 1, 2, 5, and 6, a central reinforcing band 26 is fixed to encircle the main body 12 at a mid-portion of the debris chute 10 spaced between the upper reinforcing band 18 and the lower reinforcing band 22. The central reinforcing band 26 is fixed to span the periphery of the main body 12 by lines of heavy stitching traversing the entire periphery of the main body 12. The spacing of the central reinforcing band 26 from the lower reinforcing band 22 and further spaced than the band 22 from the bottom opening 14 permits plural debris chutes 10 to be secured in series with varied overlap and for further securing options for the debris chute 10.

A plurality of central loops 28 are affixed to the main body 12 through the central reinforcing band 26. More particularly, four loops 28 are approximately equally spaced about the periphery of the main body 12 at the central reinforcing band 26. The loops 28 have free loop portions and base portions that are secured to the main body 12 by being disposed between the reinforcing band 26 and the material of the main body 12 and fixed in place as by heavy stitching, adhesive, or any other effective method or combination thereof. The base portions of the loops 28 can be fixed in place by the lines of stitching traversing the periphery of the reinforcing band 26 and, further, by heavy stitching disposed in an X or other pattern through the reinforcing band 26, the base portions of the loops 28, and the underlying material of the main body 12.

The loops 20, 24, and 28 are formed form a flexible, tough material suitable for permitting use of the loops 20, 24, and 28 to secure the debris chute 10 to a building structure 100 as in FIGS. 4 through 6 or to secure multiple debris chutes 10A, 10B, . . . 10n in series. For example, the loops 20, 24, and 28 could be formed from a heavyweight woven thermoplastic polymer, such as polypropylene. While the shape, size, and configuration of the loops 20, 24, and 28 could vary within the scope of the invention, an embodiment of the debris chute 10 could have loops 20, 24, and 28 that are approximately three inches wide and spaced along the circumference of the respective bands 18, 22, and 26. As is illustrated in FIG. 4, the loops 20, 24, and 28 could have loop portions extending proximally and distally from the reinforcing bands 18, 22, and 26. The proximally extending portion of the loops 20, 24, and 28 could be larger than the distally extending portion or vice versa.

The main body 12 of the collapsible debris chute 10 can taper from the top opening 16 to the bottom opening 14. The top opening 16 could, for example, be 33 inches wide when the material of the main body 12 is disposed in a flat configuration. The bottom opening 14 could, for example, be 31 inches wide. The main body 12 of the debris chute 10 can vary in length depending on, by way of example and not limitation, manufacturing considerations, expected usage, and other factors. One contemplated embodiment of the debris chute 10 is approximately ten feet in length. It will, of course, be understood that, these dimensions are merely illustrative. Except as might be expressly provided by the claims, the invention is not limited to any particular actual dimensions or relative sizes.

Advantageously, the tough, flexible materials forming the main body 12, the reinforcing bands 18, 22, and 26, and the loops 20, 24, and 28 permit not only the creation of a versatile and durable debris chute 10 but also the creation of a debris chute 10 that can be readily rolled or folded to an exceedingly compact configuration for transport, storage, and sale. For instance, debris chutes 10 of the materials and dimensions described herein can weigh less than three pounds and can be folded to a flat, compact configuration of, for example, approximately 14 inches by 14 inches by 1.5 inches. Such a compact configuration is impossible with rigid debris chutes of the prior art.

Depending on, among other things, the length of the main body 12 and the height over which debris must be evacuated, debris chutes 10 as taught herein can be used individually or in series, such as is illustrated in FIG. 6. Where multiple debris chutes 10A and 10B are necessary, the chutes 10 can be connected in series, such as by use of the loops 20, 24, and 28. For instance, the collapsible debris chutes 10 could, for example, be connected using rope, carabiners 30, chains, the loops 20, 24, and 28 themselves, or some other mechanism or combination thereof. With that, a chute structure formed of multiple debris chutes 10A, 10B, . . . 10n can be readily created of substantially any effective length.

Advantageously, where the lower loops 24A of a first debris chute 10A are secured to the upper loops 20B of a second debris chute 10B, the lower portion of the first debris chute 10A extending beyond the lower reinforcing band 22 and beyond the lower loops 24 can be matingly received into the top opening 16 of the second debris chute 10B. With that, the body portions 12A and 12B of the first and second debris chutes 10A and 10B overlap and present an effectively continuous passageway for debris from the entrance opening 16 of the first debris chute 10A to the exit opening 14 of the second or any additional debris chute 10B . . . 10n. Furthermore, the overlap of adjacent chutes 10A . . . 10n can be increased, such as to shorten the effective length of the chute structure created by the plural chutes 10A . . . 10n by instead affixing the upper loops 20B of a lower chute 10B . . . 10n instead to the central loops 24 of the upper chute 10A . . . 10n−1.

The flexibility of the main body 12 of the debris chute 10 further permits multiple chutes 10A . . . 10n to be fully overlapped thereby to have inner, outer, and possibly intermediate chutes 10A . . . 10n. With that, durability can be increased and fail-safe operation can be facilitated. Moreover, within the scope of the invention, debris chutes 10 can be manufactured with plural similar or different layers of material forming the main body 12.

In practice, the collapsible debris chute 10 or plural debris chutes 10A, 10B, . . . 10n can readily facilitate the removal of debris from a building structure 100, including from a second level or above, as is shown, for instance, in FIGS. 4 through 6. In view of its flexibility and reduced likelihood of causing damage to the building structure 100 and surroundings, the debris chute 10 could be carried to a given opening, such as a window opening 102, and the distal portion of the debris chute 10 simply released to achieve a setup configuration as shown in FIG. 4. In other practices of the invention, a tether could be tied to the lightweight chute 10, and the debris chute 10 can be hoisted up to the desired opening 102 where the debris is to be evacuated. The entrance opening 16 of the debris chute 10 can be secured to the building structure 100, such as by use of one or more of the upper loops 20. It will be understood that the user can choose to fasten the debris chute 10 to the building structure 100 using any effective method, including by hooks, ropes, or any other mechanism or combination of mechanisms. To facilitate secure attachment with minimal impact on the building structure 100, one or more support members can be secured across the opening 102, and the debris chute 10 can be secured to the support member. Debris can then be readily evacuated down the chute 10, such as into a waiting dumpster, a flexible intermediate bulk container (FIBC) 106, or a truck. In FIG. 4, for instance, the lower portion of the debris chute 10 is disposed to pass debris from the exit opening 14 into a flexible intermediate bulk container (FIBC) 106 with straps 108 of the bulk container 106 secured to the lower loops 24 of the debris chute 10, such as by rings 110 or other fastening mechanisms.

Where necessary or desirable, a generally rigid cylindrical substructure 104 can be matingly received into the entrance opening 16 of the debris chute 10 to maintain the flexible material of the main body 12 in a generally cylindrical configuration. For instance, a round trash barrel 104 with the bottom removed or a dedicated cylindrical lining sleeve 104 can be slipped into the upper end of the debris chute 10 to maintain a cylindrical configuration thereof for receiving debris. The exit opening 14 of the debris chute 10 can be A further application of the debris chute 10 is illustrated in FIG. 5. There, the debris chute 10 is again secured to the building structure 100 with the entrance opening 16 of the chute 10 aligned with a window opening 102 of the building structure 100. A cylindrical substructure 104 is matingly received into the entrance opening 16 of the debris chute 10 to maintain the upper portion of the chute 10 in a generally cylindrical configuration. The chute 10 is secured to the building structure 100 in this example by hooks 112 that are fixedly retained relative to the building structure 100, either directly or through a retained framework or member, and hooked through one or more of the upper loops 20 of the chute 10. The lower portion and the exit opening 14 of the chute 10 are retained spaced from the building structure 100 by a tether 114 with a first end secured to one of the lower loops 24 and a second end fixed to an external structure (not shown) spaced from the building structure 100. The loops 20, 24, and 28 can thus be used not only to secure plural chutes 10A, 10B, . . . 10n together but also to tether the debris chute or chutes 10A, 10B, . . . 10n externally to provide stabilization.

In view of the cylindrical nature of the collapsible debris chute 10, an enclosed inner volume is presented between the entrance opening 16 and the exit opening 14. There is thus little risk of debris inadvertently escaping the chute 10 during travel, and dust and other environmental contamination can be minimized or altogether prevented. In this regard, it should be understood that it would be within the scope of the invention for debris chutes 10 as taught herein to be used in a negative pressure environment as might be required for removal of asbestos and other contaminated materials. In such applications, the debris chute 10 could be maintained in an open configuration where necessary, such as by an endoskeleton, by an exoskeleton, or some combination thereof.

Particularly in light of their collapsibility and portability, debris chutes 10 as disclosed herein could be employed in a method for facilitating the evacuation and removal of debris from buildings even beyond that previously described. For instance, it is contemplated that debris chutes 10 could be commercialized online and in retail environments in conjunction with flexible intermediate bulk container (FIBC) that have become popularized for receiving commercial and residential debris for hired removal and hauling. A purchaser of a flexible intermediate bulk container (FIBC) might, by way of example, also purchase one or more debris chutes 10 as disclosed herein either in unitary packaging or as a separate purchase. With that, the debris chute 10 and the flexible intermediate bulk container (FIBC) can be employed in a synergistic way to permit a complete, start-to-finish process of debris evacuation from a building structure through the chute 10, reception and retention in the flexible intermediate bulk container (FIBC), and ready removal of the debris by hauling of the flexible intermediate bulk container (FIBC). The method might include the automatic removal of the loaded flexible intermediate bulk container (FIBC), or that may be purchased as a separate service.

To be clear, the debris chute 10 is not limited in its application to the type of material conveyed therethrough. While the debris chute 10 can be advantageously used to permit the removal of construction debris from a building structure 100, numerous other uses are possible and within the scope of the invention except as expressly limited by the claims. By way of example, the debris chute 10 could also be used for rooftop snow removal. It could also be used for passing particulate material, such as grain, asphalt, or rock salt, or for passing liquids or construction materials, such as concrete. Still further, the debris chute 10 can readily be used to pass linens and other consumer goods, comestibles, and any other material capable of passing through the chute 10. There is no requirement that the debris chute 10 be fixed to a building structure 100 as it could be readily used to pass materials from, for example, a truck to any receiving location, such as a basement. The debris chute 10 has ready application to the loading and off-loading of ships.

It will be understood that the collapsible debris chute 10 could include additional or fewer components, functions, or characteristics than those shown and described herein. Accordingly, although the foregoing components and arrangements of components may indeed be preferable and advantageous in achieving one or more objects of the invention, the collapsible debris chute 10 shall not be interpreted to require all of the foregoing components, to be limited to the specified components, or to be limited even to the positioning and configuration of individual components except as the claims might expressly specify.

Therefore, with certain details and embodiments of the present invention for a collapsible debris chute 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall be considered to define the scope of protection to be afforded to the inventors. Those claims shall be deemed to include equivalent constructions insofar as they do not depart from the spirit and scope of the invention. It must be further noted that a plurality of the following claims may express or be interpreted to express certain elements as means for performing a specific function, at times without the recital of structure or material. As the law demands, any such claims shall be construed to cover not only the corresponding structure and material expressly described in this specification but also all equivalents thereof.

We claim as deserving the protection of Letters Patent:

1. A collapsible chute for permitting the conveyance of materials, the collapsible chute comprising:
   a tubular main body with an entrance opening, an exit opening, and a body portion between the entrance opening and the exit opening wherein the main body is formed from a flexible material;
   a first reinforcing band fixed to the body portion of the main body to surround the body portion of the main body wherein the first reinforcing band is formed from a flexible material and is fixed to the body portion of the main body over a periphery of the first reinforcing band and the main body adjacent to the entrance opening;
   a first plurality of loops fixed to the first reinforcing band and the body portion of the main body wherein the first plurality of loops are spaced along the first reinforcing band;
   a second reinforcing band fixed to the body portion of the main body to surround the body portion of the main body spaced from the first reinforcing band wherein the second reinforcing band is formed from a flexible material and is fixed to the body portion of the main body over a periphery of the second reinforcing band and over the periphery of the main body spaced from the entrance opening and spaced from the exit opening; and
   a second plurality of loops fixed to the second reinforcing band and the body portion of the main body wherein the second plurality of loops are spaced along the second reinforcing band;
   a third reinforcing band fixed to the body portion of the main body to surround the body portion of the main body wherein the third reinforcing band is formed from a flexible material and is fixed to the body portion of the main body over a periphery of the third reinforcing band and over the periphery of the main body spaced between the first reinforcing band and the second reinforcing band; and
   a third plurality of loops fixed to the third reinforcing band and the body portion of the main body wherein the plurality of loops are spaced along the third reinforcing band.

2. The collapsible chute of claim 1 wherein the main body is substantially cylindrical and wherein the entrance opening and the exit opening are substantially annular when the collapsible chute is in a use configuration.

3. The collapsible chute of claim 1 wherein the first and second reinforcing bands are fixed to the body portion of the main body by stitching.

4. The collapsible chute of claim 3 wherein each of the first plurality of loops is fixed to the first reinforcing band and the body portion of the main body by stitching disposed in a pattern.

5. The collapsible chute of claim 4 wherein each of the first plurality of loops is fixed to the first reinforcing band and the body portion of the main body by stitching disposed in an X pattern.

6. The collapsible chute of claim 1 wherein the body portion of the main body has a length and wherein the second reinforcing band is fixed to the body portion of the main body spaced from the exit opening by approximately twenty percent of the length of the main body.

7. The collapsible chute of claim 1 wherein the body portion of the main body tapers from the entrance opening to the exit opening.

8. The collapsible chute of claim 1 wherein the body portion of the main body is formed from a woven thermoplastic polymer.

9. The collapsible chute of claim 8 wherein the body portion of the main body is formed from woven polypropylene.

10. The collapsible chute of claim 9 wherein the body portion of the main body is formed from lightweight flexible intermediate bulk container (FIBC) material.

11. A method for debris removal from a building structure, the method comprising:
   providing the collapsible chute of claim 1;
   affixing the entrance opening of the body portion of the main body to a building structure; and
   evacuating debris through the main body of the collapsible chute.

12. The method of claim 11 further comprising the steps of providing a flexible intermediate bulk container (FIBC) and disposing the flexible intermediate bulk container (FIBC) to receive debris from the exit opening of the main body of the collapsible chute.

* * * * *